May 7, 1935.  H. E. CULLEN ET AL  2,000,883
VALVE
Filed March 7, 1932   2 Sheets-Sheet 1
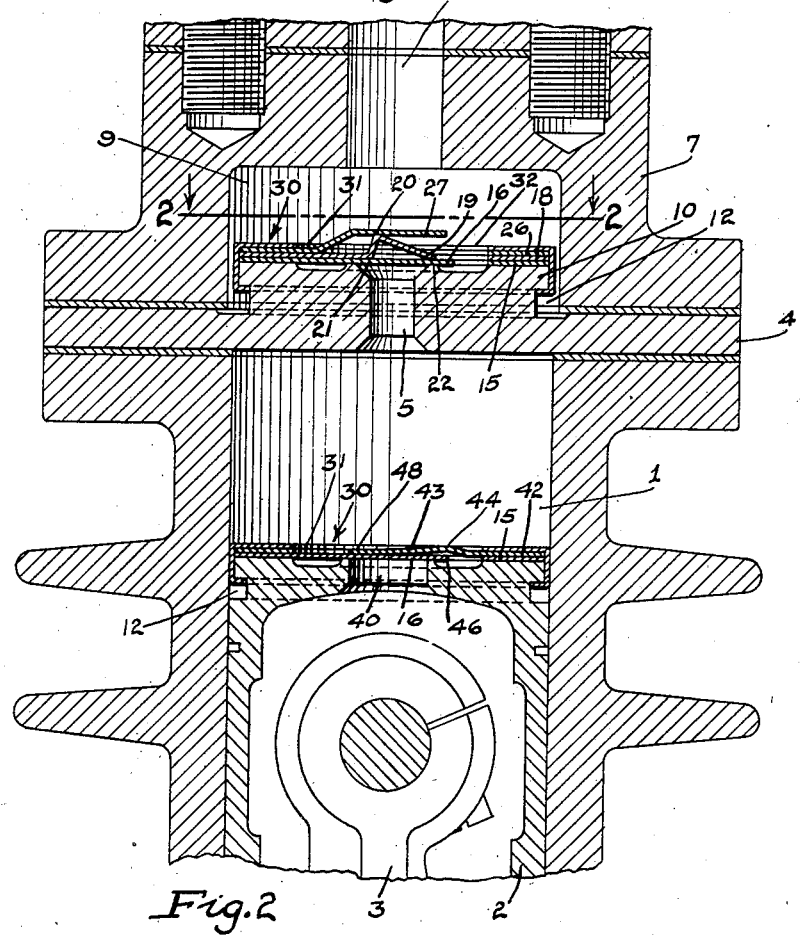
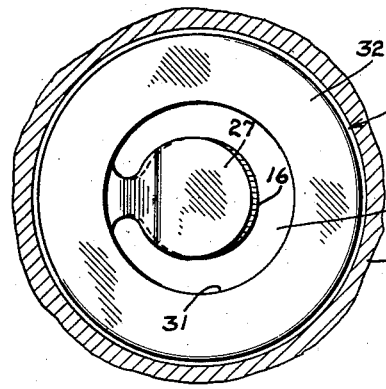
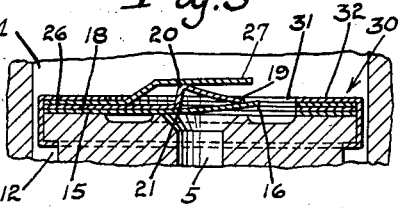
INVENTORS
HARRY E. CULLEN
HENRY O. RONNING
By Paul, Paul & Moore
ATTORNEYS May 7, 1935. H. E. CULLEN ET AL 2,000,883
VALVE
Filed March 7, 1932 2 Sheets-Sheet 2
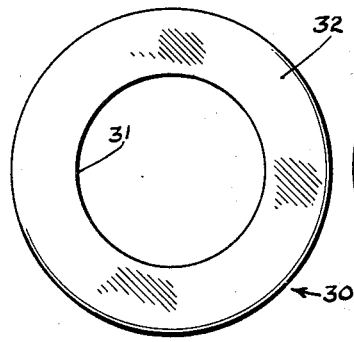
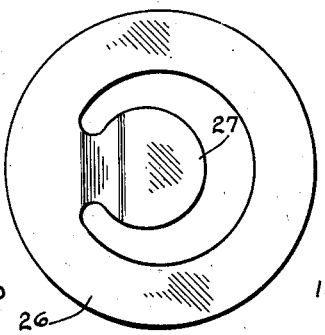
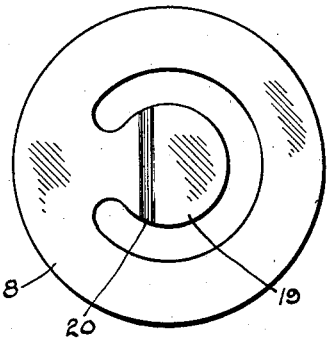
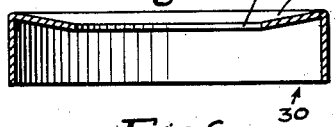
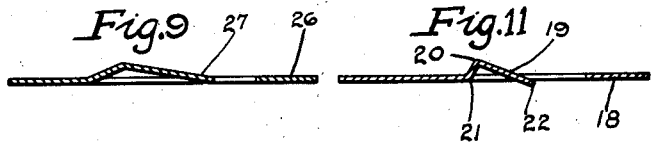
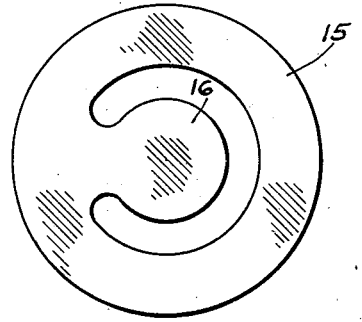
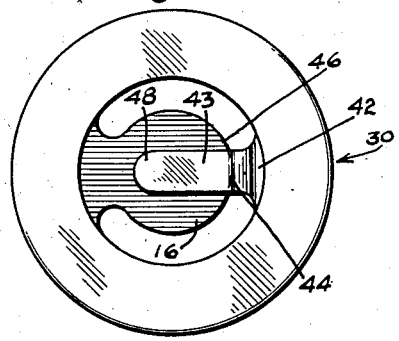
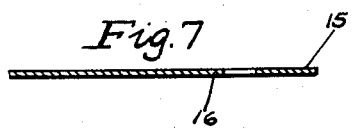
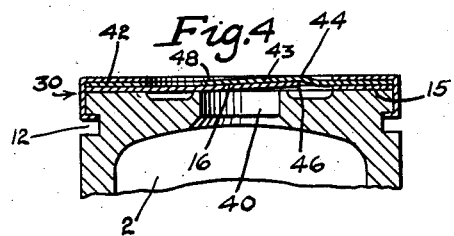
INVENTORS
HARRY E. CULLEN
HENRY O. RONNING
By Paul, Paul & Moore
ATTORNEYS Patented May 7, 1935

2,000,883

UNITED STATES PATENT OFFICE 2,000,883

VALVE

Harry E. Cullen and Henry O. Ronning, Minneapolis, Minn., assignors to Henry P. Watson, Minneapolis, Minn.; Alfred F. Pillsbury and Bessie Watson executors of said Henry P. Watson, deceased Application March 7, 1932, Serial No. 597,363

20 Claims. (Cl. 230—221)

This invention relates generally to improvements in flap valve structures, and to means for securing the valve in operative position, as well as particularly to flap valve structures for use in compressors either for attachment to the piston, or to the cylinder head. The flap valve itself is of well-known construction and its structure includes an annular portion by which it is attached, and a circular extension or flap portion which defines with the annulus a substantially circular slot or orifice, through which the controlled fluid passes. At present these valves are quite noisy and it is an important object of this invention to provide means by which to modify the valving action and prevent noise. It is also an object of the invention generally to provide means for attaching the valve in operative relation, and particularly for attaching it either to a piston or to a cylinder head. It is further an object to give the means which modifies the valve action substantially the same configuration as the valve itself and to superpose this modifying element, or a plurality of such elements, upon the valve and compressively secure the elements in operative position by a cap which is, in turn, secured by punching its wall into a circumscribing groove provided in the structure, with which the valve is associated.

Features include all details of construction, as well as the broader ideas of means inherent in the disclosure.

Objects, features and advantages of the invention will be set forth in the description of the drawings forming a part of this application, and in said drawings Figure 1 is a vertical section through a compressor showing the present invention applied to the piston, and cylinder head;

Figure 2 is a plan section through the head on line 2—2 of Figure 1;

Figure 3 is a vertical section of the valve structure of the head, showing the valve in open position. In the drawings it has been necessary to exaggregate the degree of valve opening;

Figure 4 is a detail section of the piston showing its valve structure in open position;

Figure 5 is a top plan view of Figure 4;

Figure 6 is a plan view of the flap valve structure;

Figure 7 is a diametric section of the structure of Figure 6 taken in direction of extension of the flap;

Figure 8 is a top plan view of the outermost valve-action-modifying element;

Figure 9 is a diametric vertical section of Figure 8;

Figure 10 is a view of the arched valve-action-modifying element;

Figure 11 is a vertical diametric section of Figure 10;

Figure 12 is a plan view of the resilient cap for securing the elements together under compression; and Figure 13 is a diametric vertical section of the structure of Figure 12.

In the drawings, the compressor cylinder is generally indicated at 1, the piston at 2 and connecting rod at 3. Numeral 4 indicates the plate forming a portion of the head and having the usual passage 5 establishing communication between the cylinder 1 and the pressure chamber. The outer portion of the head is indicated at 7 having the outlet passage 8 and the head has the valve chamber 9.

The plate 4 is provided with a upward cylindrical extension indicated at 10 which has in its cylindrical wall a circumferential groove 12. Flatly against the top flat face of this cylindrical extension is arranged a flat spring metal flap valve structure 15, having its flap portion 16 operatively associated with the passage 5. Laid flatly against this element 15 is a second flat spring metal element 18, also see Figure 10, of substantially the same configuration as the valve element and including the extension 19. This flap or extension is bent as at 20 to form an arch, the terminals 21 and 22 of which contact the flap 16 at points inwardly from its free end, and respectively substantially immediately adjacent opposite sides of the outlet end of the passage 5. Superposed upon the element 18 is a third flat spring element 26, see Figure 8, which has a flap or extension 27 which is also arched and the free end of which engages the arched portion of the extension 19, in this instance at the bend line 20 as shown. The point of engagement of the extension 27 with the arch may be varied, as well as the points of engagement of the extension or arch 19 with the flap 16. These elements act to yieldingly resist opening movement of the flap 16. It will be noted that the bend 20 is formed along a line which is transverse to the direction of extension of the flap and the line may be said to correspond to a diameter or a chord. In some instances, the arch element 19 only may be used, or only the element 27. Ordinarily the thicknesses of the elements 15, 18 and 26 are equal, and about .005 of an inch. The pressure action opens this valve about .010 of an inch. The degree of opening, of course, varies with the pump speed. Shaft rotation is about five hundred per minute. Vibration occurs when the valve is off its seat.

Referring first to Figure 11: It will be noted that the spring metal flap 19 normally lies in the position shown, so that when the arch element 19 is pressed against the flap element 16, the element 19 is moved upwardly against its spring tension, from its position in Figure 11, thus creating compression which acts downwardly against the flap 16. The extension 27 of element 26 lies substantially in the position shown in Figure 9 before application. In applying, the extension 27 engages the peak 20, and is pushed upwardly against its spring tension, thus creating a compresion which acts on the peak 20 of the arch. The main object here is to prevent that character or frequency of vibration which produces noise, and to reduce this vibration to a minimum by a very simple device which can be cheaply manufactured, and the parts of which can be cheaply assembled.

A novel means is provided for compressively securing the elements 15, 18 and 26 in operative relation flatly and sealingly against each other, whatever their plan or transverse contours. Referring to Figures 12 and 13, as well as to Figure 1: This element is formed of spring metal and ordinarily about .012 of an inch thick. It is in the shape of a cap or cup 30 and has a central orifice 31 in its top wall 32. The top wall is sprung downwardly as shown, and as the device is applied, this wall is moved upwardly against its own tension. When in proper position, its cylindrical wall is punched into the groove 12, as shown, and in this way, this element resiliently compressively acts upon the immovable parts of the elements 15, 18 and 26 to sealingly secure them in operative relation. This is a valuable feature of the invention. It provides a cheap and efficient way for connecting the elements. It is noted that the punched-in wall of the cap is continuous, thus providing a sealed connection.

The anti-vibrating means for the piston valve is somewhat simpler in construction, since it requires a smaller amount of extraneously applied force than that applied to the upper valve, because this piston valve is opened as the result of suction on retracting motion of the piston. Nevertheless, this embodiment shows the broad application of the principle of modification of the motion of the flap to stop the noise. Since the piston valve is operated at atmospheric pressures only, its vibratory action is not as violent, nor is its amplitude as great as that of the head valve, which latter valve operates under pressures very much greater than atmospheric pressures. This piston valve opens about .005 of an inch. The piston is provided with the usual suction orifice or inlet passage 40, as the passage to be controlled (see Figures 1 and 4) and a spring metal flap valve structure 15 is operatively associated with the passage. A flat spring metal element indicated at 42, see Figure 4, is placed flatly against the valve element 15 and this element has a finger-like extension 43, see also Figure 5, which, in this instance, but not always extends from its annulus in a direction opposite that of the flap or extension 16, and, as shown in Figure 1, is normally arranged in bridging relation to the free end 46 of the flap. The peak 44 of the bridge lies in opposition to the end 46 of the flap 16. The positional relations of these parts may be varied under certain conditions, just as the positional relations of the parts 19—16, 27—19, and 27—16, may be varied. Nevertheless, the positional relations shown are claimed, as well as the broader features. The outer or free end portion 48 of this finger-like extension 43 engages the flap valve at a point substantially immediately adjacent the corresponding side of the controlled end of the orifice 40, that is, at that side of the orifice farthest from the point of connection of the finger 43 with its ring. In this instance, the element 42 is about .005 of an inch thick, as compared with .003 for the thickness of the flap 16.

The method of attachment by means of element 30 is of advantage, in that the close relationship of the upper end of the cylinder to the plate or head 4, on the compression stroke of the piston, demands a fastening means which occupies little space.

One of the features of this invention is the provision of means by which extraneous force is yieldably applied by one element to the other to modify the vibration effects in the manner mentioned. In all the devices known to us, whether used in relation to the piston or the head valves, there is vibration and "clicking" during operation. By the use of the present device, there is virtually no clicking.

In practice, as applied to compressors of the type shown, the upper valve opens about .010 of an inch, the lower valve opens approximately .005 of an inch, the degrees of movement varying directly as the speed of the pumping strokes. Ordinarily the shaft rotates at about 500 revolutions per minute. Of course, the upper valve moves a greater distance to open than the lower, because of the fact that it is opened during a compression stroke of the piston. The amplitude of vibration of this upper valve and its degree of clicking is therefore, in the ordinary commercial devices, greater than the lower valve.

Another feature is the use of valve control elements having substantially the same contour as the valve element which they control so that they can be stamped from the same die, the flaps or extensions being thereafter specially formed for the intended purpose.

We claim as our invention:

1. In a device of the class described, a structure having a passage to be controlled, a spring metal flap valve structure operatively associated with the passage, a second spring metal flap valve structure having a finger which engages the flap portion of the first valve to yieldably resist its opening movement, and a spring metal cap acting by resiliently initiated pressure to secure the elements sealingly against one another and against the structure.

2. A device of the class described having a structure having a passage to be controlled, a spring metal annulus having a flap portion operatively associated with the passage, a second spring metal element having a finger which engages the flap portion of the first valve to yieldably resist its opening movement, and a spring metal cap acting to secure the elements against one another and against the structure.

3. In a device of the class described, a structure having a passage to be controlled, a spring metal flap valve structure operatively associated with the passage, a second spring metal element having a finger which engages the flap portion of the first valve to yieldably resist its opening movement, and a third spring metal element having a finger engaging the second spring metal element to yieldably resist its movement by the opening valve, and means acting to secure the elements in operative relation.

4. In a device of the class described, a structure having a passage to be controlled, a spring metal flap valve structure operatively associated with the passage, a second spring metal element having an extension having an arched portion, the terminals of which engage the flap portion of the first valve to yieldably resist its opening movement, a third spring metal element having an extension engaging the arched portion to yieldably resist its movement caused by the opening valve, and means acting to secure the elements in operative relation.

5. In a device of the class described, a structure having a passage to be controlled, a spring metal flap valve structure having a free end operatively associated with the passage, a second spring metal element having an extension which engages the flap portion of the first valve to yieldably resist its opening movement, and a third spring metal element having an extension engaging the second spring metal element to yieldably resist its movement by the opening valve, means acting to secure the elements in operative relation, the resilient pressures being applied by the spring metal elements to the flap immediately adjacent the passage, and at at least one point which is adjacent the free end of the flap.

6. In a device of the class described, a structure having a passage to be controlled, a spring metal flap valve structure operatively associated with the passage, and having a flap portion or extension, two spring metal elements superposed upon the valve structure one having an extension which is bent to form a bridge, the terminals of which engage the flap portion of the first valve, and the other having an extension engaging the second spring metal element in the bridging area all to yieldingly resist movement by the opening valve, and means acting to secure the elements in operative relation, the bridge being formed by bending along a line which is transverse to direction of extension of the flap.

7. In a device of the class described, a structure having a passage to be controlled, a spring metal flap valve structure operatively associated with the passage, and having a flap portion or extension which is substantially circular, two spring metal elements superposed upon the valve structure one having an extension which is sharply bent to form a bridge the terminals of which engage the flap portion of the first valve, and the other having an extension engaging the second spring metal element at the bend line, all to yieldingly resist movement by the opening valve, means acting to secure the elements in operative relation, the bridge being formed by bending along a line which is transverse to direction of extension of the flap, the point or points of applied pressure being immediately adjacent the passage and at least one point being adjacent the free end of the flap portion.

8. In a device of the class described, a cylindrical structure having a passage to be controlled, a thin flat disk of spring metal having a substantially circular flap extension operatively associated with the passage and having a free end, the structure providing a circularly segmental outlet orifice substantially circumscribing the flap portion, a second spring metal element of substantially the same configuration in which the flap portion is bent to form an arch, the terminals of which contact the flap respectively at points inwardly from its free end, one immediately adjacent its free end, and means securing the spring elements in operative relation.

9. In a device of the class described, a cylindrical structure having a passage to be controlled, a spring metal flap valve structure having a flap extension operatively associated with the passage and having a free end, a second spring metal element having an extension bent to form an arch, the terminals of which contact the flap respectively at points inwardly from its free end and substantially immediately adjacent opposite sides of the outlet end of the passage, and means securing the spring elements in operative relation.

10. In a device of the class described, a structure having a cylindrical outer surface and a passage to be controlled, a thin disk of spring metal having a substantially circular flap extension operatively associated with the passage, the structure providing an outlet orifice substantially circumscribing the flap portion, a second spring metal element of substantially the same configuration in which the flap portion is bent away from the flap in the manner of an arch to provide a line contact with the flap at a point inwardly from its free end and to provide substantially a point contact with the flap at its free end, and a third spring metal element of substantially the same configuration as the others and having an extension which resiliently compressively acts upon the arched portion, the two last named elements acting cooperatively to yieldably resist opening of the flap, and means securing the spring metal elements in operative relation.

11. In a device of the class described a structure having a passage to be controlled, a first flap valve structure comprising a spring metal disk slotted to provide a centrally located flap, a second spring metal flap valve structure engaging the first and having an opening and a finger projecting there-across and engaging the flap of the first valve structure, the flap valve and said finger extending in opposite directions from their junction points with their disks, and means securing the disks to the first mentioned structure in operative relation.

12. In a device of the class described a structure having a passage to be controlled, a flap valve structure operatively associated with the passage, and comprising a spring metal disk having a centrally located flap, a second spring metal disk lying flatly against the first and punched centrally to provide an opening and a finger projecting there-across, said finger being engaged with said flap at a point relatively remote from the free end of the flap, and substantially in opposition to that margin of the controlled passage which is farthest from the junction of the finger with its disk, the said finger bridging the free end of the flap, before the parts are flexed for valving action.

13. In a device of the class described a structure having a passage to be controlled, a flap valve structure operatively associated with the passage and comprising a flat spring metal disk circumferentially slotted to provide a centrally located substantially circular flap, a second spring metal disk lying flatly against the first and punched centrally to provide an opening and a finger projecting radially from the margin of the opening inwardly and diametrically with reference to the flap, the outer portion of said finger being engaged with said flap at a point relatively remote from the outer margin of the passage which is farthest from the junction of the finger with its disk, the said finger bridging the free end of the flap before the parts are flexed for valving action.

14. In a device of the class described a structure having a passage to be controlled, a flap valve structure operatively associated with the passage and comprising a flat spring metal disk having a centrally located flap, a second spring metal disk lying flatly against the first and punched to provide an opening and a finger projecting radially from the margin of the opening inwardly, said finger being engaged with said flap and said finger bridging a portion of the flap.

15. In a device of the class described a structure having a passage to be controlled, a flap valve structure operatively associated with the passage and comprising a spring metal disk having a flap and a marginal portion, a cap of resilient material having a flange which engages the marginal portion of the valve structure to compressively sealingly secure it against the first mentioned structure, the compressive function of the cap being obtained as the result of flexion of the flange portion from an initially different position, and means for securing the cap in operative position.

16. In a device of the class described a structure having a passage to be controlled, a flap valve structure operatively associated with the passage and comprising a spring metal disk slotted to provide a flap and a circumscribing marginal portion, a cap of resilient material having an opening in its top of sufficient size to permit proper valving action and to provide a flange which engages the marginal portion of the valve structure to compressively sealing secure it against the first mentioned structure, and means for securing the cap in operative position, the compressive function of the cap being obtained as the result of flexion of the flange from an initially different position.

17. In a device of the class described a structure having a passage to be controlled, a flap valve structure operatively associated with the passage and comprising a flat spring metal disk circumferentially slotted to provide a flap and a circumscribing marginal portion, a cap of resilient material having an opening in its top of sufficient size to permit proper valving action, and to provide a flange which flatly engages the corresponding flat marginal portion of the valve structure to compressively sealingly secure it against the first mentioned structure, the compressive function of the cap being obtained as the result of flexion of the flange from an initially different position, and means for securing the cap in operative position comprising a circumferential groove in the first mentioned structure with which the rim portion of the cap is engaged.

18. In a device of the class described, a structure having a passage to be controlled, a spring metal flap valve structure operatively associated with the passage and a spring metal annulus having a flange in flexed condition and engaging the immovable part of the valve structure and acting as a result of its flexed condition to compressively engage and secure the valve structure in operative relation.

19. In a device of the class described, a cylindrical structure having a passage to be controlled, and having on its cylindrical surface a circumscribing shoulder, a spring metal flap valve structure operatively associated with the passage and an annular cylindrical spring metal element having a flexed flange circumferentially compressively acting as a result of its flexed condition on a part of the valve structure to secure said structure in operative relation, the spring metal element being secured by having its periphery engaged with the shoulder.

20. A cylindrical piston having a circumscribing shoulder in its cylindrical face, said piston having a passage to be controlled, a flap valve structure arranged to control the passage and an annular cylindrical spring metal cap having a flexed flange circumferentially engaging a part of the valve structure and acting as a result of its flexed condition to compressively secure said part of the valve structure in operative relation to the piston, said cap having a marginal portion engaged with said shoulder to secure the cap in operative position and the outer cylindrical surface of said marginal portion of the cap being substantially coplanar with the corresponding surface of the piston.

HARRY E. CULLEN.
HENRY O. RONNING.